United States Patent
Miyoshi et al.

(10) Patent No.: US 6,319,128 B1
(45) Date of Patent: Nov. 20, 2001

(54) VIDEO GAME APPARATUS, METHOD OF CONTROLLING ANIMATION DISPLAY IN VIDEO GAME, AND COMPUTER-READABLE STORAGE MEDIUM STORING ANIMATION DISPLAY CONTROLLING PROGRAM OF VIDEO GAME

(75) Inventors: Takemasa Miyoshi, Yawata; Kentaro Nagayama, Osaka, both of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/401,360

(22) Filed: Sep. 21, 1999

(30) Foreign Application Priority Data

Sep. 22, 1998 (JP) .................................. 10-268502

(51) Int. Cl.[7] .................................. A63F 13/00
(52) U.S. Cl. .................................. 463/31; 463/30
(58) Field of Search .................................. 273/148 B, 3; 463/43, 44, 45, 1, 7, 30–37, 46

(56) References Cited

U.S. PATENT DOCUMENTS

| | | | |
|---|---|---|---|
| 5,142,803 | * | 9/1992 | Lang .................................. 446/385 |
| 5,198,893 | * | 3/1993 | Lang .................................. 358/93 |
| 5,214,355 | | 5/1993 | Hood et al. . |
| 5,232,223 | * | 8/1993 | Dornbusch .................................. 273/148 B |
| 5,542,672 | * | 8/1996 | Meredith .................................. 463/37 |
| 5,713,792 | * | 2/1998 | Ohzono et al. .................................. 463/7 |
| 5,730,655 | * | 3/1998 | Meredith .................................. 463/37 |
| 5,897,437 | * | 4/1999 | Nishiumi et al. .................................. 463/47 |
| 5,980,261 | * | 11/1999 | Mino et al. .................................. 463/42 |

FOREIGN PATENT DOCUMENTS 0916375   5/1999  (EP) .

OTHER PUBLICATIONS

Interplay's Virtual Deep Sea Fishing http:www.pcgr.com/reviews/Classicssports and http:www.interplaysports.com/fishing/deepsea.html, Jan. 1998.*

* cited by examiner

Primary Examiner—Valencia Martin-Wallace
Assistant Examiner—Julie Kasick
(74) Attorney, Agent, or Firm—Jordan and Hamburg LLP (57) ABSTRACT

A video game apparatus implementing a simulating fishing game displays an animation image representing behavior of a fish hooked on a lure. The video game apparatus has a first determining unit determines that a first condition has been met, when a fish is hooked on a lure by the operation of a game procedure controlling unit, or when the fish under the control of the game procedure controlling unit exhibits such a behavior as to apply a strong tension on the fishing line or to jump up above the water surface. An animation display controlling unit causes a monitor to display an animation image which has been stored in a storage medium and which represents a fished hooked on a fishing line, in such a manner as to enable identification of the fisher character who has hit the fish. A switching unit switches the game display screen displayed on the monitor from the fishing image to the animation image, when the first determining unit has determined that the first condition is met.

27 Claims, 8 Drawing Sheets

FIG. 8

VIDEO GAME APPARATUS, METHOD OF CONTROLLING ANIMATION DISPLAY IN VIDEO GAME, AND COMPUTER-READABLE STORAGE MEDIUM STORING ANIMATION DISPLAY CONTROLLING PROGRAM OF VIDEO GAME

BACKGROUND OF THE INVENTION

1. Field of the Invention

The present invention relates to a video game apparatus which employs a storage medium storing program data, such as an optical disk, a magnetic disk, a semiconductor memory or the like, as well as to an animation display controlling method for use in such a video game and to a readable storage medium which stores an animation display controlling program.

2. Description of the Related Arts

Hitherto, various types of game systems have been proposed such as a system employing a combination of a home-use exclusive game machine and a television receiver, a business-used exclusive game machine, a system employing a combination of a personal computer or a work station, a display unit and a voice output device.

Each of these systems has the following components: a controller to be operated by the player; a storage medium recording a game program data; a CPU which performs various kinds of control for generating sounds and images in accordance with the game program data; a processor for generating images; a processor for generating sounds; a CRT for displaying the images; and a speaker for outputting the sound. CD-ROMs, semiconductor memories, and cassettes incorporating semiconductor memories are major storage mediums used in the game systems of the type described above.

As a kind of video games implemented by these game systems, a fishing game is conceivable which simulates a fishing competition between fisher characters on a simulated fishing site displayed on a game display screen.

In the meantime, a technique has been commonly adopted in the field of video games, in which the game display screen is switched from one to another in accordance with an operation performed by the user on operating means of the game system and, in addition, animation images are displayed regardless of the operation on the operating means so as to enhance the realistic feel of the game. It is desirable that the fishing game of the kind described above also employs such animation images suitably displayed on the displaying means.

SUMMARY OF THE INVENTION

In view of the foregoing, it is an object of the present invention to provide a video game apparatus which implements a fishing game simulating a fishing competition between a plurality of fisher characters, wherein animation images are suitably displayed on the displaying means, as well as an animation display controlling method for use in a video game and a computer readable storage medium storing an animation display controlling program for use in a video game.

To these ends, in accordance with the present invention, there is provided a video game apparatus which implements a competition between fisher characters in a simulated fishing site in which the fisher characters attempt to fish up by fishing lines fishes that exhibit predetermined behaviors, the video game apparatus comprising: a plurality of operating means corresponding to the respective fisher characters, for giving fishing action instructions to the respective fisher characters; displaying means for displaying a game display screen; image storing means for storing animation images representing behaviors of hooked fishes; fishing display controlling means for causing the displaying means to display, as the game display screen, a fishing image including the simulated fishing site and the fisher characters; first determining means for determining whether a predetermined first condition pertaining to fishing has been met; animation display controlling means for causing the displaying means to display, as the game display screen, the animation images; and switching means for switching the game display screen from the fishing image to the animation images when the first determining means has determined that the first condition has been met; wherein the animation display controlling means displays the animation images in such a manner as to enable identification of the fisher character whose fishing line has hooked up a fish.

In accordance with these features, a fishing image composed of a simulated fishing site and a plurality of fisher characters is displayed as a game display screen on the displaying means. The fisher characters compete with one another at the fishing site by fishing up, by means of their fishing lines, fishes which exhibit predetermined behaviors. Determination is made as to whether a predetermined condition pertaining to fishing has been met and, when it is determined that the first condition is met, the game display screen is temporarily switched from the fishing image to animation images. The animation images are displayed in such a manner as to enable identification of the fisher character whose fishing line has hooked up the fish of the animation images, so that players understand who has hit the fish. Thus, the animation images are suitably displayed on the displaying means.

The video game apparatus may be arranged such that the animation display controlling means causes the displaying means to display, at a predetermined position on the displaying means, a letter which identifies the fisher character whose fishing line has hooked up the fish of the animation image.

With this arrangement, letters which indicate the fisher character whose fishing line hooked on the fish of the animation display are displayed at a predetermined position on the display means, so that the game player can know without fail which one of the fisher characters has hit the fish.

The video game apparatus may further comprise: second determining means for determining whether a predetermined second condition pertaining to fishing has been satisfied; and switching prohibiting means for prohibiting the switching of the game display screen when the second determining means has determined that the second condition has been met.

With this arrangement, a determination is made as to whether a predetermined second condition pertaining to fishing has been met and, when it is determined that the second condition is met, the switching operation to be performed by the switching means is prohibited. The second condition may be determined to be a condition or a situation where the display of the animation image is inadequate. When such a situation has occurred, the second condition is met to prevent the animation image from being displayed.

The video game apparatus may further comprise time measuring means for measuring time lapsed after each switching of the game display screen performed by the switching means, wherein the second determining means determines that the second condition has been met, when the time measured by the time measuring means by the moment at which the first determining means has determined that the first condition is met is not longer than a predetermined time.

With this arrangement, time lapsed is measured from the moment at which the game display screen is switched by the switching means, each time such a switching is performed. The second determining means determines that the second condition is met, when the measured time lapsed is not longer than a predetermined time at the moment at which the first condition is determined to have been met. This arrangement avoids suspension of the display of the fishing image due to frequent switching of the game display screen to the animation image.

The video game apparatus may further comprise operation determining means for determining, when the first determining means has determined that the first condition is met, whether the operating means for a fisher character other than the identified fisher character is giving an instruction for a specific action among fishing actions, wherein the second determining means determines that the second condition has been met when the operation determining means has determined that the instruction for the specific action is being given to the other fisher character.

According to the described features, when the first condition is determined to have been met, a determination is made as to whether an instruction for a specific action among fishing actions is being given to a fisher character other than the identified fisher character is giving an instruction. The second condition is determined to have been met when it is determined that the instruction for the specific action is being given to the other fisher character. Therefore, the switching to the animation image is prohibited when the other fisher character is performing a predetermined action such as casting, thereby preventing the display of the casting action from being suspended due to switching from the fishing image showing the casting action to the animation image.

The present invention in its another aspect provides a method of controlling animation display in a video game which implements a competition between fisher characters in a simulated fishing site in which the fisher characters attempt to fish up by fishing lines fishes that exhibit predetermined behaviors, wherein the method comprises: giving instructions for fishing actions to the fisher characters by means of operating means corresponding to the respective fisher characters; causing displaying means to display, as a game display screen, a fishing image which includes the simulated fishing site and the fisher characters; determining whether a predetermined first condition has been met; temporarily switching the game display screen from the fishing image to an animation image that represents behaviors of a fish hooked by a fishing line, when the first condition has been determined to be met; and displaying the animation image in such a manner as to enable identification of the fisher character whose fishing line has hooked up the fish of the animation image.

In this method, a fishing image containing an image of a simulated fishing site and a plurality of fishing characters is displayed as a game display screen on the displaying means, and a competition is performed between the fisher characters by attempting to fish up by fishing lines fishes that exhibit predetermined behaviors. A determination is made as to whether a predetermined first condition pertaining to fishing has been met and, when the first condition is determined to have been met, the game display screen is temporarily switched from the fishing image to an animation image. The animation image is displayed in such a manner as to enable identification of the fisher character whose fishing line has hooked up the fish of the animation image, so that the game player can understand which one of the fisher characters has hit the fish, whereby the animation image is suitably displayed on the displaying means.

The present invention in its still another object provides a readable storage medium storing an animation display controlling program for use in a video game which implements a competition between fisher characters in a simulated fishing site in which the fisher characters attempt to fish up by fishing lines fishes that exhibit predetermined behaviors, the program comprising: an instructing step for giving instructions for fishing actions to the fisher characters by means of operating means corresponding to the respective fisher characters; a fishing displaying step for causing displaying means to display, as a game display screen, a fishing image which includes the simulated fishing site and the fisher characters; a first determining step for determining whether a predetermined first condition pertaining to fishing has been met; a switching step for temporarily switching the game display screen from the fishing image to animation images that represent behaviors of a fish hooked by a fishing line, when the first condition has been determined to be met; and an animation displaying step for displaying the animation images in such a manner as to enable identification of the fisher character whose fishing line has hooked up a fish.

When the storage medium is loaded on a computer to enable the computer to execute the program, a fishing image containing an mage of a simulated fishing site and a plurality of fishing characters is displayed as a game display screen on the displaying means, and a competition is performed between the fisher characters by attempting to fish up by fishing lines fishes that exhibit predetermined behaviors. A determination is made as to whether a predetermined first condition pertaining to has been met and, when the first condition is determined to have been met, the game display screen is temporarily switched from the fishing image to an animation image. The animation image is displayed in such a manner as to enable identification of the fisher character whose fishing line has hooked up the fish of the animation image, so that the game player can understand which one of the fisher characters has hit the fish, whereby the animation image is suitably displayed on the displaying means.

These and other objects, features and advantages of the present invention will become clear from the following description of the preferred embodiments when the same is read in conjunction with the accompanying drawings.

DESCRIPTION OF THE PREFERRED EMBODIMENTS

Figure 1:
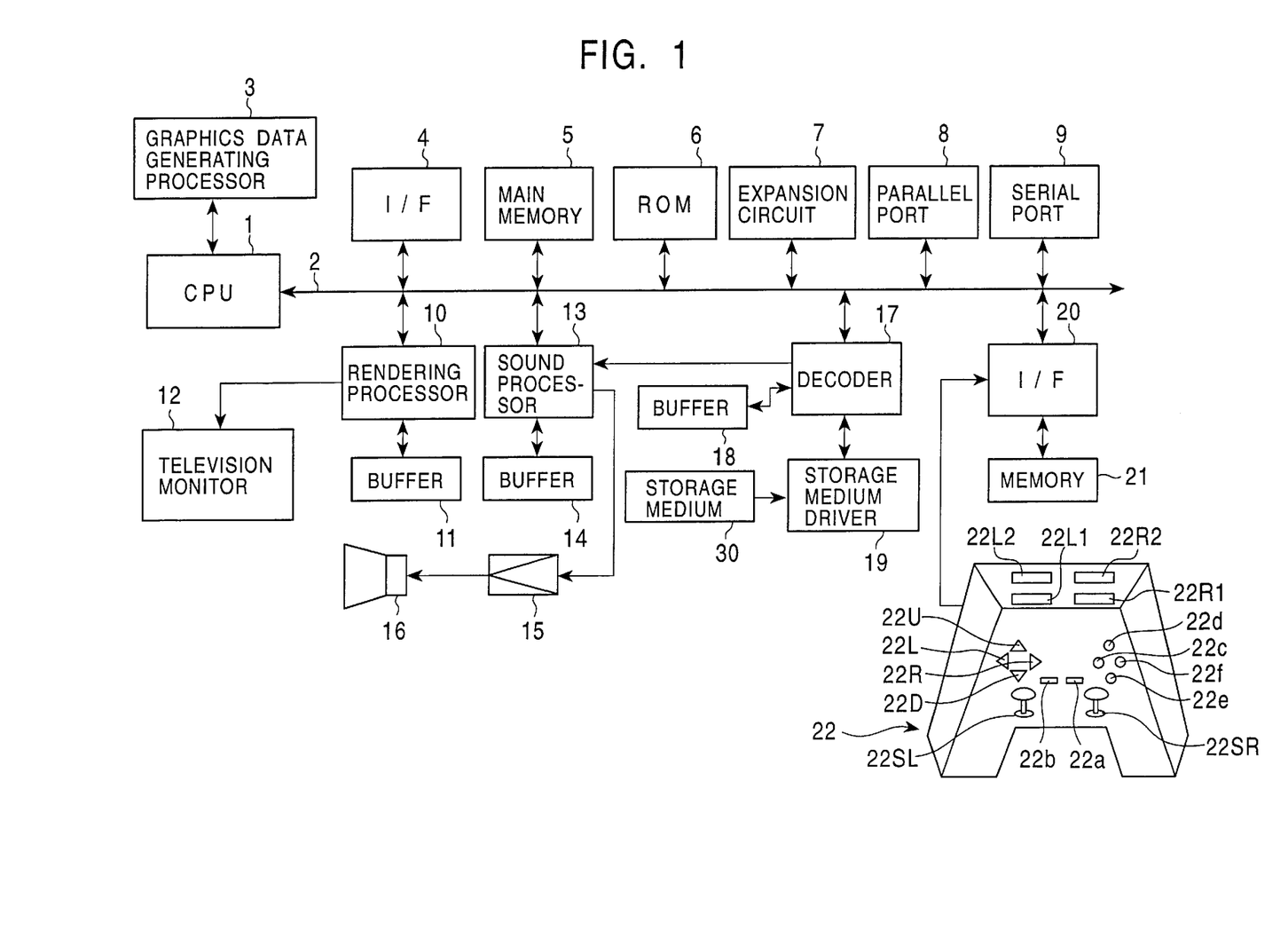
FIG. 1 is a diagram showing the configuration of a game system as an embodiment of the present invention.

FIG. 1 is a block diagram showing the construction of a game system as an embodiment of the present invention. The game system has a game machine main unit and a storage medium 30 storing program data. The main unit includes a CPU 1, a BUS 2 connected to the CPU 1 and including an address BUS, a data BUS and a control BUS, a graphics data generating processor 3, and various components connected to the BUS 2.

The components connected to the BUS 2 includes an interface circuit 4, a main memory 5 having, for example, a RAM, a ROM 6, an expansion circuit 7, a parallel port 8, a serial port 9, a combination of a rendering processor 10 and a buffer 11, a combination of a sound processor 13 and a buffer 14, a combination of a decoder 17 and a buffer 18, and a combination of an interface circuit 20 and a memory 21.

To the rendering processor 10 is connected a television monitor (referred to simply as a "monitor", hereinafter) 12 which serves as displaying means. A speaker 16 is connected to the sound processor 13 through an amplifier circuit 15. A storage medium 19 driver is connected to the decoder 17. A memory 21 and a controller 22 are connected to the interface circuit 20.

The arrangement of the above-described game system varies according to the use. For instance, when the above-described game system is intended for home use, the monitor 12 and the speaker 16 are separately provided.

In contrast, when the game system is arranged as a business game system, all the devices and components shown in FIG. 1 are consolidated and mounted in a common housing.

When the above-described game system is constructed on a core machine such as a personal computer or a work station, the monitor 12 can be implemented by the computer display, while the rendering processor 10, sound processor 13 and the expansion circuit 7 are implemented by part of program data stored in the storage medium 30 or by hardware on an extension board which is loaded in an extension slot of the computer. Likewise, the interface circuit 4, parallel port 8, serial port 9 and the interface circuit 20 are implemented by hardware on an extension board which is loaded in an extension slot of the computer. Buffers 11, 14 and 18 are presented by the main memory 5 or by storage areas in an extension memory which is not shown.

The embodiment, arranged as a home-use game system will be described by way of example.

A description will now be given of each of the devices and components shown in FIG. 1.

The graphics data generating processor 3 functions as a co-processor which co-operates with the CPU 1. More specifically, the graphics data generating processor 3 performs parallel processings to execute computations such as coordinate transformation, light source calculation, and computation of fixed-decimal-point matrix and vectors. The main task of the graphics data generating processor 3 is to determine addresses of points on an image under processing, based on data supplied by the CPU 1, such as coordinate data, translation amount data and rotation amount data on polygon apices in two- or three-dimensional plane, and to deliver the address data back to the CPU 1. It is also one of the main tasks of the graphics data generating processor 3 to calculate luminance of the display screen in accordance with the distance from an imaginary light source.

The interface circuit 4 provides an interface for connection to peripheral devices such as a pointing device, e.g., a mouse, a tack ball or the like. The ROM 6 stores a program data which implements an operating system of the game system. In case of a personal computer, the ROM 6 is constituted by, for example, a BIOS (Basic Input Output System).

The expansion circuit 7 performs expansion or decompression of an that has been compressed by intra-coding which follows, in the case of a moving picture, MPEG (Moving Picture Engineering Group) and JPEG (Joint Picture Engineering Group) in case of a still image. The expansion processing includes decoding processing (decoding of data that has been encoded by VLC: Variable Length Code), inverse quantization, IDCT (Inverse Discrete Cosine Transform) processing, restoration of an intra-image, and so forth.

The rendering processor 10 executes rendering processing on the buffer 11, in accordance with rendering instructions given by the CPU 1.

The buffer 11 is constituted by, for example, a RAM and has a display area (frame buffer) and a non-display area. The display area is an area in which data to be displayed on the display screen of the monitor 12 is developed.

In the illustrated embodiment, the non-display area stores various kinds of data such as data defining skeletons, model data defining polygons, animation data which implements motions of a mode, and pattern data showing the contents of the animation pictures, as well as texture data, color pallet data, and so forth.

The texture data are two-dimensional image data, while the color pallet data are data that designate colors of the texture data. These data are copied to the non-display area of the buffer 11 from the storage medium 30 at once or in a plurality of times in accordance with the progress of the game, under the control of the CPU 1.

There are two types of rendering instructions: namely, rendering instructions for rendering three-dimensional images by using polygons and rendering instructions for forming ordinary two-dimensional images. The polygons are polygonal-shaped two-dimensional imaginary patterns. The illustrated embodiment employs triangular or quadrilateral patterns.

The rendering instruction for rendering a three-dimensional image by means of polygons include: polygon apices address data indicating addresses of polygon apices on the display area of the buffer 11, texture address data indicating the addresses on the buffer 11 where the texture data to be pasted to polygons are stored, color pallet address data indicating the addresses on the buffer 11 where the color pallet data designating the colors of the texture data are stored, and luminance data indicating the luminance of the texture.

The polygon apices address data are two-dimensional polygon apices coordinate data generated through a coordinate transformation from coordinate data which represent coordinates of apices of a polygon in a three-dimensional space and which are received from the CPU 1, the transformation being performed by the graphics data generating processor 3 based on the translation amount data and rotation amount data of the display screen itself. The luminance data also is generated by the graphics data generating processor 3, based on the position indicated by the polygon apices coordinate data which have been obtained through the above-described coordinate transformation and which are given by the CPU 1, in accordance with the distance from the imaginary light source.

The polygon apices address data indicates the addresses on the display area of the buffer 11. The rendering processor 10 writes texture data corresponding to a polygon in a region of the display area of the buffer 11 defined by three or four pieces of polygon apices address data.

One object is constituted by a number of polygons. The CPU 1 operates such that the coordinate data of each polygon in the three-dimensional space is stored in the buffer 11 in relation to the corresponding skeleton vector data. The CPU 1 performs the following processings when the character is to be moved on the display screen, i.e., when the controller 22 is operated so as to move the character itself or to move a viewing point from which the character is viewed.

Namely, the CPU 1 supplies the graphics data generating processor 3 with the three-dimensional coordinate data of each polygon that have been stored in the non-display area of the buffer 11 and also with translation amount data and rotation amount data for each polygon, determined based on the coordinates of the skeleton and the rotation amount data of the skeleton.

Based on the polygon apices three-dimensional coordinate data and the polygon translation amount and rotation amount data thus supplied, the graphics data generating processor 3 sequentially determines the three-dimensional coordinate data of the polygon after the translational movement and the three-dimensional coordinate data of the polygon after the rotation.

Among the three-dimensional coordinate data on each polygon thus determined, the horizontal and vertical coordinate data are supplied to the rendering processor 10, so as to be used as the address data on the display area of the buffer 11, i.e., as the polygon apices address data.

The rendering processor writes, in triangular or quadrilateral areas on the buffer 11 defined by the three or four pieces of polygon apices data, the texture data that have been allocated to the respective polygons. Consequently, the display screen of the monitor 12 displays an object constituted by a number of polygons to which texture data have bee pasted.

The rendering instruction for forming an ordinary two-dimensional image contains apices address data, texture address data, color pallet address data indicating positions on the buffer 11 where the color pallet data designating texture data colors are stored, and a texture luminance data indicative of the luminance of the texture. Among these data, the apices address data are coordinate data that are obtained through a coordinate transformation performed by the graphics data generating processor 3 on the two-dimensional apices coordinate data derived from the CPU 1, based on the translation amount data and the rotation amount data which also are received from the CPU 1.

The sound processor 13 writes the ADPCM data read from the storage medium 30 into the buffer 14. The ADPCM data stored in the buffer 14 are used as the source of sounds. The sound processor 13 reads the ADPCM data in accordance with a clock of, for example, 44.1 kHz. The sound processor 13 effects various processings on the ADPCM data read from the buffer 14, such as a change of the pitch, addition of noise, setting of envelope, setting of sound level, addition of reverb, and so forth.

When the sound data read from the storage medium 30 is PCM data such as CD-DA (Compact Disk Digital Audio) data, the sound data is converted into ADPCM data by means of the sound processor 13.

The processing effected on the PCM data in accordance with the program data is executed directly on the main memory 5. The PCM data processed on the main memory 5 is supplied to the sound processor 13 and converted by the sound processor 13 into the ADPCM data. The ADPCM data thus obtained are subjected to the above-described processings and then output as sounds from the speaker 16.

The storage medium driver 19 may be any one of a CD-ROM driver, a hard disk drive, an optical disk drive, a flexible disk drive, a silicon disk drive, a cassette medium reader, and so forth.

The storage medium 30 may be any one of a CD-ROM, hard disk, optical disk, flexible disk, semiconductor memory, and so forth.

The storage medium driver 19 reads data such as image data, sound data and program data from the storage medium 30, and supplies the read data to the decoder 17. The decoder 17 effects an error correction processing by means of ECC (Error Correction Code) on the reproduced data derived from the storage medium driver 19, and delivers the error-corrected data to the main memory 5 or to the sound processor 13.

The memory 21 has a holder and a card-type memory. The card-type memory is used to hold various parameters of the game, e.g., to hold the state obtained when the game is finished.

The controller 22 serves as an externally operable operating means and includes the following parts: a first left button 22L1, a second left button 22L2, a first right button 22R1, a second right button 22R2, an upward key 22U, a downward key 22D, a leftward key 22L, a rightward button 22R, a start button 22a, a select button 22b, a first button 22c, a second button 22d, a third button 22e, a fourth button 22f, a left stick 22SL and a right stick 22SR. The controller 22 delivers various operation signals to the CPU 1 in accordance with the operation performed by the game player.

The upward key 22U, downward key 22D, leftward key 22L and the rightward key 22R enable the game player to deliver to the CPU 1 various commands for moving, for example, a character or a cursor up and down and to the left and right on the display screen of the monitor 12.

The start button 22a enables the game player to give to the CPU 1 an instruction to start the game program data loaded from the storage medium 30. The select button 22b is used by the game player to give to the CPU various selections concerning the game program data to be loaded from the storage medium into the main memory 5.

The buttons and keys on the controller 22, except for the left stick 22 SL and the right stick 22SR, are on-off switches of the type which is turned on when pressed down from a neutral position by an external force and turned off by being reset to the neutral position when relieved from the pressing external force.

The left stick 22SL and the right stick 22SR are stick-type controllers having a construction substantially the same as that of a so-called joystick. More specifically, each of the left and right sticks 22SL, 22SR includes an upright stick which is tiltable about a fulcrum in all directions including back and forth and left and right directions. A coordinate system is set up having x- and y-axes intersecting at the origin constituted by the neutral upright position of the stick. When the stick is tilted, an x-coordinate value indicative of a position in the left and right directions and a y-coordinate value indicative of a position in the forth and back directions are generated in accordance with the direction and angle of the tilt, and are delivered as an operation signal to the CPU 1, via the interface circuits 15 and 10.

The functions allocated to the first left button 22L1, second left button 22L2, first right button 22R1 and the second right button 22R2 vary according to the kind of the game program data loaded from the storage medium 30.

A pair of controllers 22 of the same construction are connectable to the game apparatus of the illustrated embodiment. Therefore, a game mode is available in which two game players enjoy the video game, when two controllers 22 have been connected to the game apparatus.

A description will be given of the outline of the operation of this game system.

The game system is supplied with electrical power when a power switch (not shown) is turned on. If the storage medium 30 has been loaded on the storage medium driver 19, the CPU 1 operates in accordance with the operating system stored in the ROM 16, so as to give an instruction to the storage medium driver 19 to cause the driver 19 to read program data from the storage medium 30. In response to the instruction, the storage medium driver 19 reads image data, sound data an program data from the storage medium 30.

The image data, sound data an program data read from the storage medium 30 are supplied to the decoder 17 which performs error correction on these data. The image data after the error correction performed by the decoder 17 is supplied to the expansion circuit 7 via the BUS 2, so as to undergo the aforesaid processings performed by the expansion circuit 7. The image data thus processed is supplied to the rendering processor 10 which in turn writes the image data into the non-display area of the buffer 11.

The sound data after the error correction performed by the decoder 17 is supplied to the main memory 5 or to the sound processor 13, and is written in the main memory 5 or in the buffer 14.

The program data after the error correction performed by the decoder 17 is supplied to and written in the main memory 5. Thereafter, the CPU 1 proceeds with the game based on the game program data stored in the main memory 5 and contents of instructions given by the game player through the controller 22. Namely, the CPU performs control of processings such as the image processing operation, sound processing operation an other internal processings, in accordance with the contents of the instructions given by the user through the controller 22.

In this embodiment, the control of image processing operation includes the following operations: computation of coordinates of skeletons and computation of polygon apices coordinate data based on pattern data which corresponds to moving picture representing the action instruction given to each character; delivery of the thus-obtained three-dimensional coordinate data and viewing point data to the graphics data generating processor 3; production of rendering instructions including the address data on the display area of the buffer, as well as the luminance data, determined by the graphics data generating processor 3.

The control of the sound processing includes issuance of sound output commands to the sound processor 13, designation of the sound level and reverb, and so forth. The control of internal processings includes computations performed in accordance with the operation input given through the controller 22.

A description will now be given of a video game which is implemented by the described game system, with reference to FIG. 2 which shows a display screen which is displayed when the game proceeds.

The video game which will now be described is a lure fishing game in which the scenery of a fishing site such as a lake is displayed on the monitor 12, wherein fisher characters 31 cast lures 34 by swinging their fishing rods 32, and fish up a fish 35 that has been hooked by the lure. In the illustrated embodiment, the fishing game proceeds in a dual-player mode in which a first fisher character 31a under the control of a first game player and a second fisher character 31b under the control of a second game player are displayed to join in the game. This mode, however, is not exclusive and the game may proceed in a single-layer mode.

The time available until expiration of a time limit for the game is shown at the center of an uppermost region of the display screen on the monitor 12, while configurations of lures 33 under the use, selected from various predetermined lure configurations, are displayed on both lateral sides of the time display region. The "BIG 3 TOTAL" indicated below each lure configuration shows the total weight of three heaviest fishes selected from among the fishes fished-up by each fisher character. On each of the left and right ends of the display screen, there are shown a tension gauge 36 indicating the tension applied to the fishing line 34 by the fish 35 hooked on and moving to and fro, and a lure depth gauge 37 indicating the depth of the lure from the level of the water surface.

The game condition is set such that the hooked fish 35 is freed or the fishing line 34 is cut when a tension indicator reaches an upper limit on the tension gauge 36.

Figure 3:
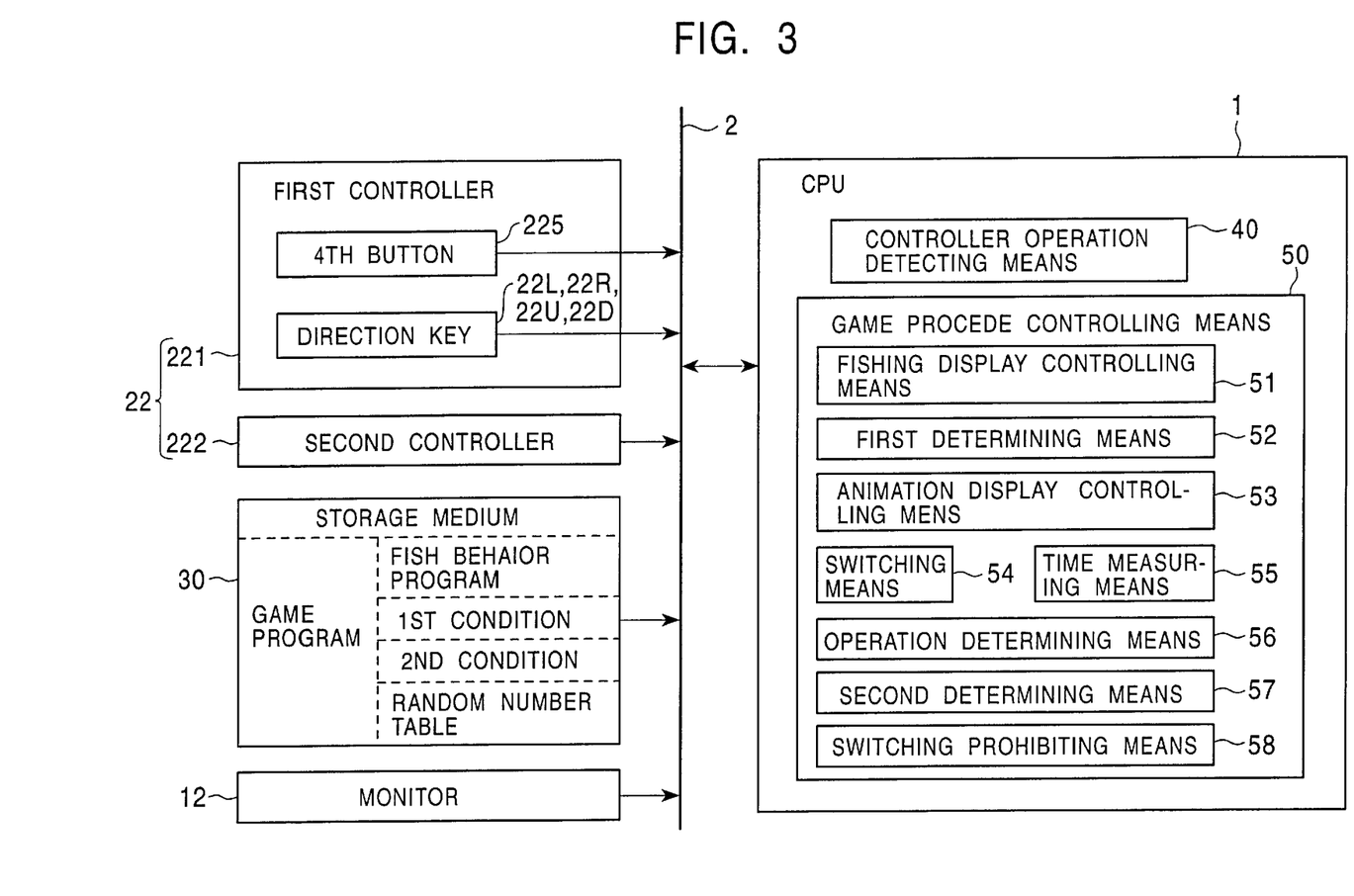
FIG. 3 is a block diagram showing functions of a CPU and major components of the system shown in FIG. 1.

FIG. 3 is a diagram showing function blocks of the CPU 1, as well as blocks constituting a major part of the game system shown in FIG. 1. FIGS. 4 to 7 are illustrations of display screens appearing during displaying animation images.

Referring to FIG. 3, the storage medium 30 stores the game program of the fishing game described heretofore. The game program includes a fish behavior program for controlling the movement of the fish, first and second conditions which will be described later, a random number table, and so forth. The storage medium 30 also stores animation images which represent the behavior of the fish 35 that has been hooked on, as part of the above-mentioned game program. (image storage means)

As stated before, two sets of controllers of the same construction, a first controller 221 and a second controller 222, collectively referred to as the controller 22, are connectable to the game apparatus. Thus, in this embodiment, the first controller 221 and the second controller 222 are connected, so that the first fisher character 31a (see FIG. 2) acts in accordance with operation signals given by the first controller 221, while the second fisher character 31b (see FIG. 3) acts in accordance with operation signals given by the second controller 222. In the following description, the first and second controllers 221 and 222 are inclusively referred to as the "controller 22", unless it becomes necessary to describe the functions of these controllers separately.

The CPU 1 has function blocks including controller operation detecting means 40 and a game procedure controlling means 50. The controller operation detecting means 40 detects the operations effected on the respective operating means of the controller 22, based on the operation signals output from the controller 22.

The game procedure controlling means 50 controls various devices and components of the system shown in FIG. 1, based on the state of operations effected on the controller 22 as detected by the controller operation detecting means 40 and on the game program stored in the storage medium 30.

For instance, the game procedure controlling means 50 has the following functions.

(1) A function for controlling the behavior of the fish 35 based on the fish behavior program
(2) A function for controlling, based on the state of operations effected on the controller 22 and the game program, whether the fish 35 can be hooked on by the lure 33.
(3) Functions to control, based on the state of operations effected on the controller 22 and the game program, actions of the fisher character. For instance, the direction in which the fishing rod is directed is changed in accordance with operations on the direction keys 22L, 22R, 22U and 22D. The casting operation is performed based on the operation on the fourth button 22f. Reeling up of the fishing line 34 is effected by a rotational operation effected on the right stick 22SR.
(4) A function to control, when the fish 35 has been hooked on by the lure 35, the display of the tension gauge based on the result of determination of the tension applied by the fish 35 on the fishing line 34, wherein the tension is determined based on the direction of movement of the fish 35 determined by the game program and the amount of reel-up of the fishing line 34.
(5) A function to determine, based on the amount of reel-up of the fishing line 34 and the direction of the fishing rod 32, the depth of the lure 33 from the level of the water surface and to display the depth on the lure depth gauge 37 in accordance with the result of the determination.
(6) A function to perform such a control as to neglect any operation signal input through the controller 22 during displaying the animation image which will be described later.

The game procedure controlling means 50 have function blocks including a fishing display controlling means 51, first determining means 52, animation display controlling means 53, switching means 54, time measuring means 55, operation determining means 56, second determining means 57, and a switching prohibiting means 58.

Figure 2:
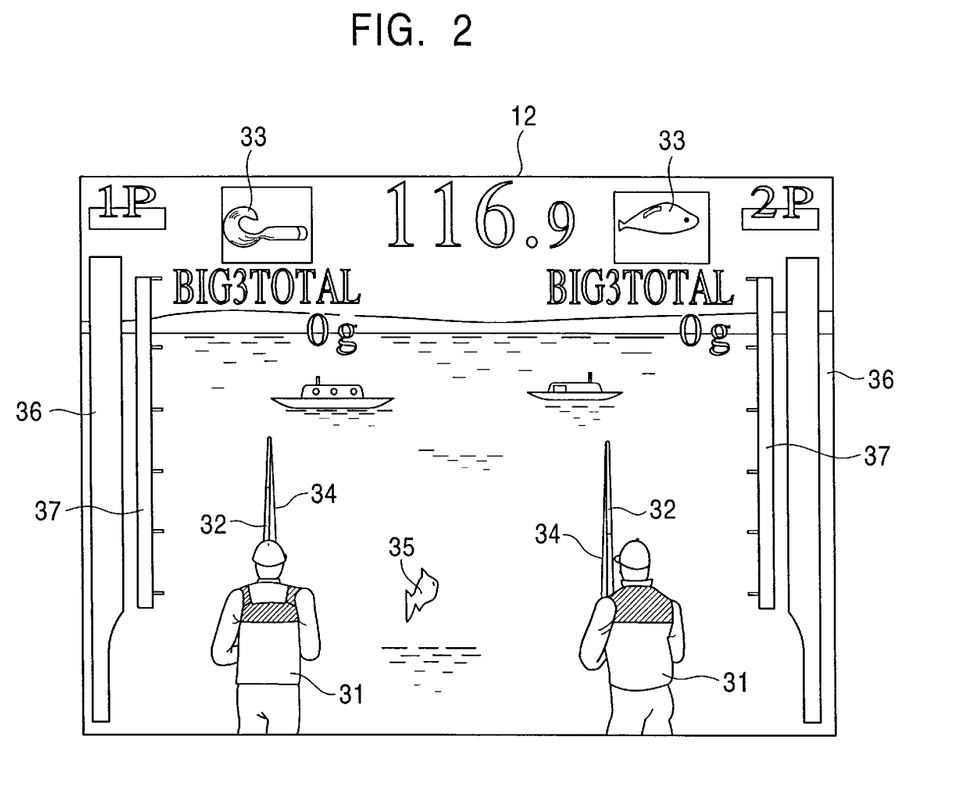
FIG. 2 is an illustration of a display screen which is displayed in the course of a game.

The fishing display controlling means 51 enables the monitor 12 to display a fishing image which includes a simulated fishing site and fisher characters 31, as shown in FIG. 2. Thus, the actions such as casting action are displayed on the monitor 12.

Referring back to FIG. 3, the first determining means 52 has the following functions:
(1) a function to determine that the first condition has been met, when the fish 35 is hooked on by the lure 33 in the course of the procedure of the game under the control of the game procedure controlling means 50; and
(2) a function to determine that the first condition has been met, when the fish 35 controlled by the game procedure controlling means exhibits a specific behavior such as jumping above the water surface or when a large tension is applied to the fishing line 34 hooking up the fish 35.

The animation display controlling means 53 serves to cause the monitor 12 to display animation images that have been stored in the storage medium 30 and that represent the fish 35 hooked on the fishing line 34 (or the lure 33). As will be seen from FIGS. 4 to 7, the animation images are displayed in such a manner as to identify the fisher character who has hit the fish 35 which is being displayed by the animation images.

Figure 4:
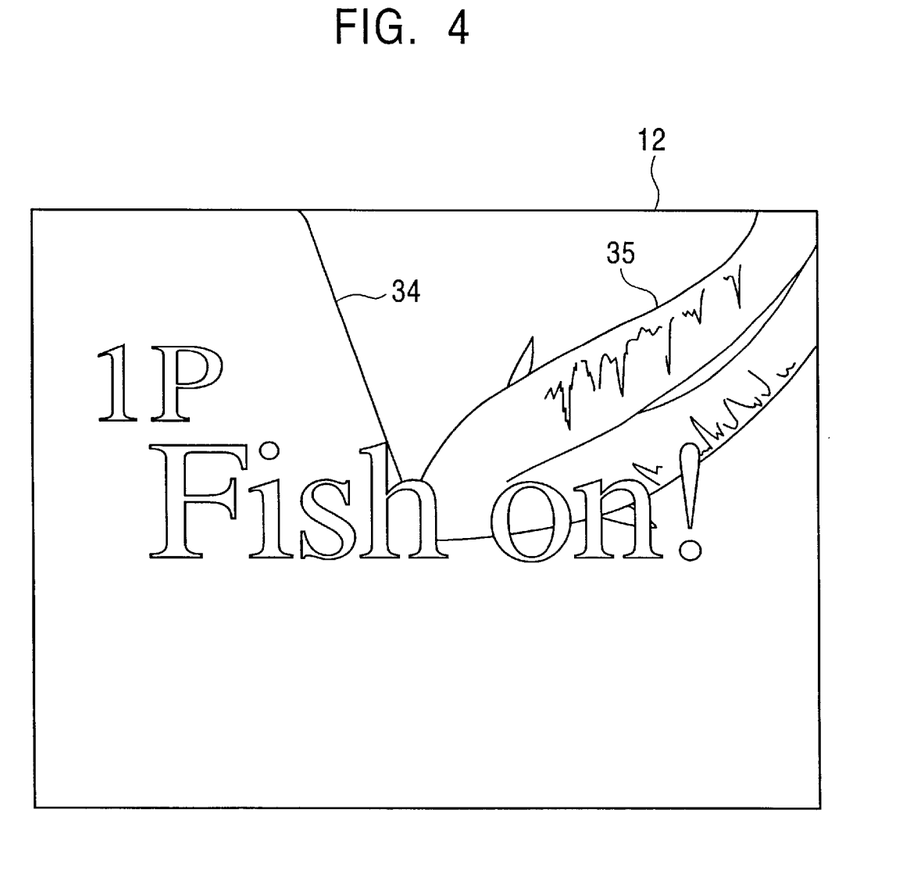
FIG. 4 is an illustration of a display screen on a monitor, displaying an animation image.
Figure 5:
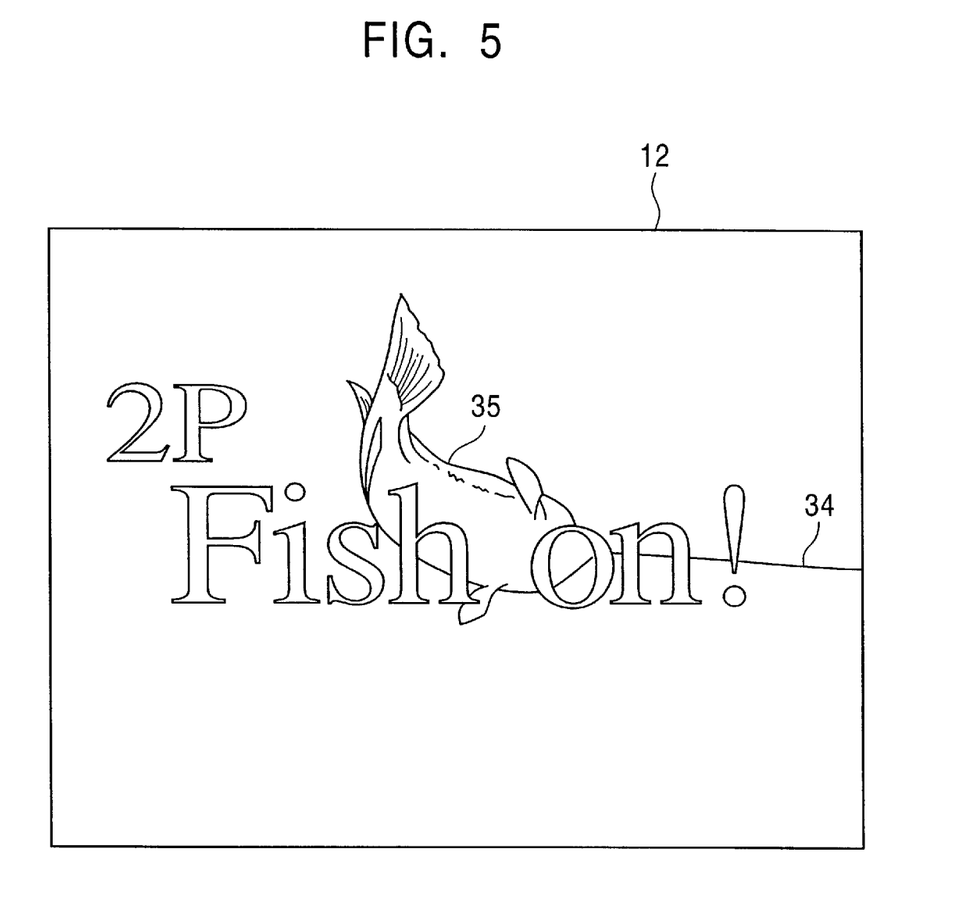
FIG. 5 is an illustration of a display screen on a monitor, displaying an animation image.

More specifically, FIGS. 4 and 5 show animation images that are displayed when the fish 35 is hooked on by the fishing line 34 (or the lure 33) of either fisher character. In FIG. 4, the letters "1P" are displayed to indicate that the fisher character who has hit the fish is the first fisher character 31a (see FIG. 2), whereas, in FIG. 5, letters "2P" are displayed to indicate that the second fisher character 31b (see FIG. 2) has hit the fish, thus enabling identification of the fisher character who has hooked the fish on.

Figure 6:
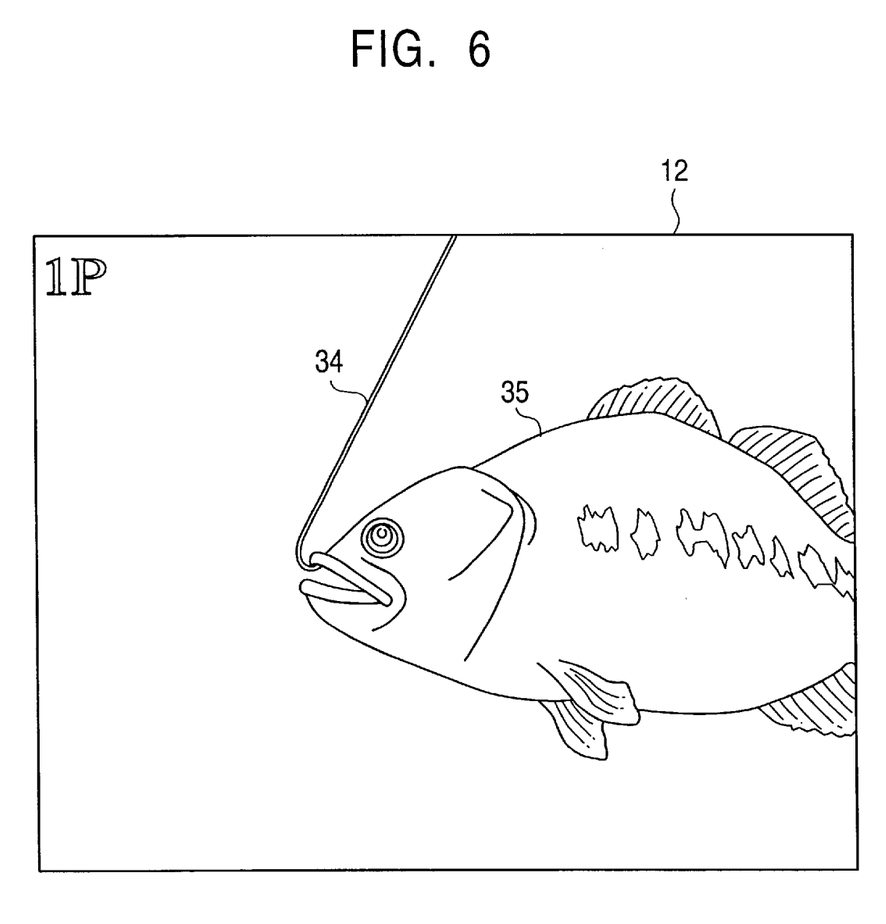
FIG. 6 is an illustration of a display screen on a monitor, displaying an animation image.
Figure 7:
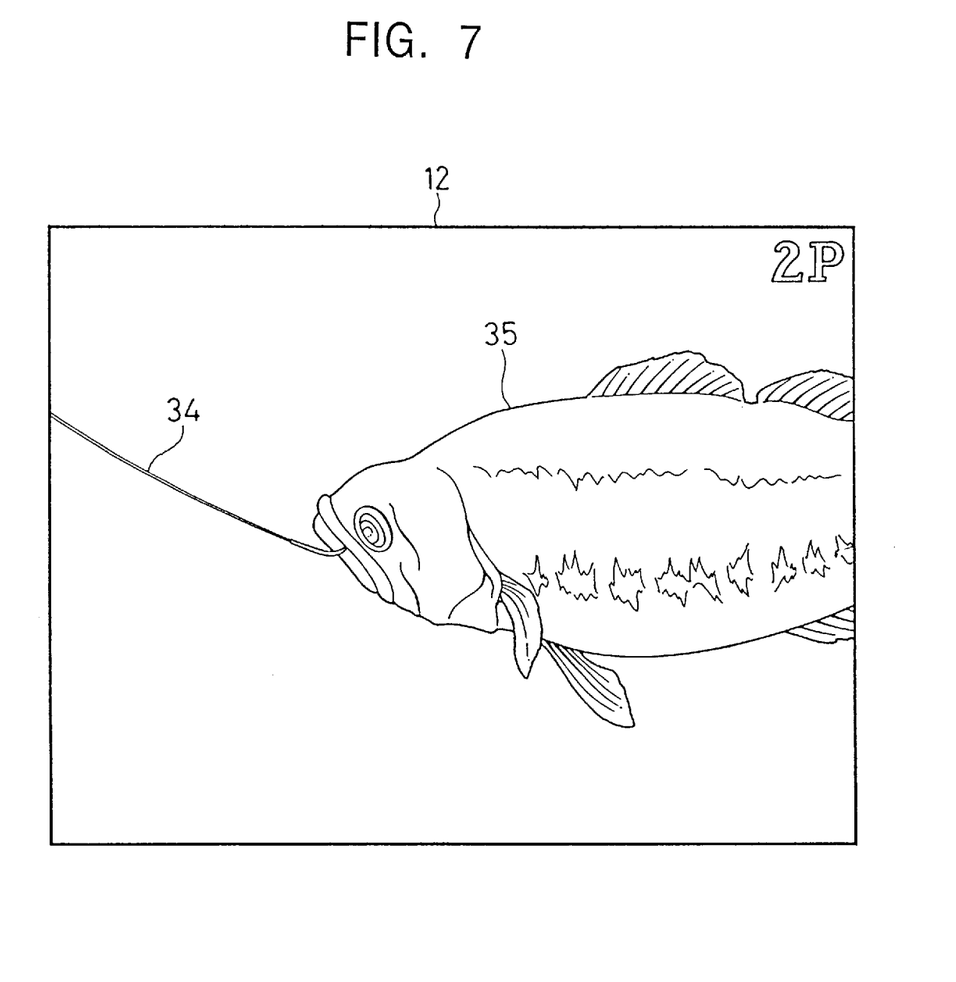
FIG. 7 is an illustration of a display screen on a monitor, displaying an animation image.

FIGS. 6 and 7 show animation images that are displayed when large tension is applied by the fish 35 on the fishing line 34. In FIG. 6, the letters "1P" are displayed at the left upper corner of the display screen to indicate that the fisher character who has hit the fish is the first fisher character 31a (see FIG. 2), whereas, in FIG. 7, letters "2P" are displayed at the right upper corner of the display screen to indicate that the second fisher character 31b (see FIG. 2) has hit the fish, thus enabling identification of the fisher character who has hooked the fish on.

Referring again to FIG. 3, the switching means 54 operates so that, when the first determining means 52 has determined that the first condition is met, the game display screen on the monitor 12 is switched from the fishing image shown in FIG. 2 to an animation image, e.g., the animation image shown in FIG. 4. The program is set so as to reset the game display screen to the fishing image after displaying a predetermined animation image. The time measuring means 55 measures time elapsed after the moment at which the game display screen is switched from the fishing image to the animation screen, each time the switching is performed. The operation determining means determines, when the first determining means has determined that the first condition has been met, whether the fisher character other than the fisher character that is being noted, i.e., the fisher character other than the fisher character whose fishing line 34 has hooked on the fish 35 displayed by the animation image, is performing casting.

The second determining means 57 has the following functions.
(1) A function to determine that the second condition is met, when the determination by the first determining means that the first condition is met has been made before lapse of a predetermined time after the last display of animation image.
(2) A function to determine that the second condition is met, on condition that the fisher character other than the fisher character that is being noted is performing casting, after the determination by the first determining means that the first condition is met.
(3) A function to extract a number in accordance with the random number table stored in the storage medium 30 when the first determining means has determined that the first condition is met, and to determine that the second condition is met when the extracted numeral indicates an odd number.
(4) A function to prohibit execution of the functions (1) to (3) described above and to determine that the second condition is not met, if the first condition determined by the first determining means as being met indicates that the fish 35 has been hooked on by the fishing line 34 of each fisher character.

The switching prohibiting means 58 has a function to prohibit, when the second determining mans has determined that the second condition is met, the switching operation performed by the switching means 54 for switching the game display screen from the fishing image to the animation image.

Figure 8:
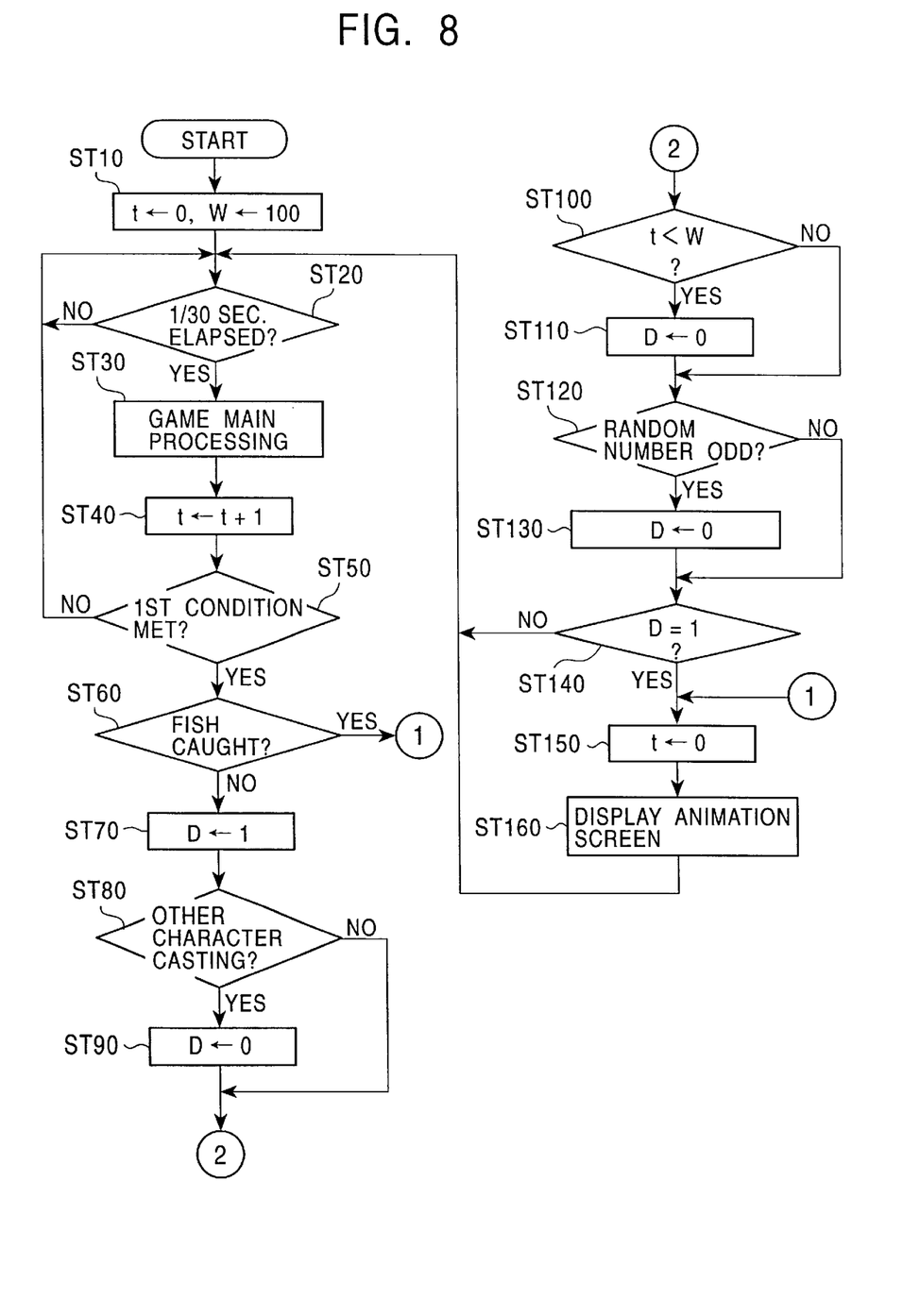
FIG. 8 is a flowchart showing a process which follows an animation display controlling program.

A description will now be given of the procedure of the animation display controlling program, with reference to a flowchart shown in FIG. 8.

When the power supply is turned on, an initializing processing is executed such as clearing the contents of the RAM. At the same time, the counter "t" is reset to 0, and the constant W is set to 100 (Step ST10).

Then, whether 1/30 second has elapsed is determined (Step ST20) and, a routine ST30 onward is executed at every 1/30 second (each time an answer YES is given in Step ST20). More specifically, the fishing image is displayed on the monitor 12 and the main processing of the game is started (Step ST30).

A counter is incremented by 1 (Step ST40), and whether the first condition is met is determined (Step ST50). If the first condition has not been met (answer "NO" is given in Step ST50), the process returns to Step ST20.

Conversely, if the first condition has been met (answer "YES" is given in Step ST50), a determination is made as to whether the condition indicates that a fish 35 has been hooked on a fishing line 34 (or a lure 33) (Step ST60). If the condition indicates that the fish 35 has been hooked on (answer "YES" is given in Step ST60), the process skips to Step ST150 in which an animation image is displayed, without executing determining operations in Steps ST80, ST100 and ST120.

Conversely, if the first condition does not indicate a hit on the fish 35 (answer "NO" is given in Step ST60), an indicator flag D which indicates whether the display should be switched to the animation image is set to "1" (Step ST70).

Then, a determination is made as to whether a fishing character other than the fisher character under the question in Step ST50 in regard to the first condition is performing casting (Step ST80). If casting is not being performed (answer "NO" is given in Step ST80), the process advances to Step ST100, whereas, if casting is being performed (answer "YES" is given in Step ST80), the indicator flag D is set to "0" so as to prohibit switching to the animation image (Step ST90).

Then, the count "t" by the counter is compared with the constant W (Step ST100). If the condition t<W is met (answer "YES" is given in Step ST100), the process advances to Step ST120, whereas, if the condition is t<W (answer "NO" is given in Step ST100), the indicator flag D is reset to "0", so that switching of the display to the animation image is prohibited (Step ST110).

The routine of the Steps ST30 onwards is executed for every 1/30 second, and the count "t" of the counter is incremented by "1" in Step ST100 upon each completion of the routine. Therefore, the condition t<W is met to hold the indicator flag D at "0" until 10/3 seconds elapses from the start. After lapse of 10/3 seconds, the condition is changed to t>W, so that the process advances to Step ST120.

Then, a number is extracted from in accordance with the random number table (Step ST120). If the numeral indicates an even number (answer NO is given in Step ST120), the process advances to Step ST140, whereas, if the numeral indicates an odd number (answer "YES" is given in Step ST120), the indicator flag D is reset to "0", thereby prohibiting switching of the display screen to the animation image (Step ST130).

Then, a determination is made as to whether the status of the indicator flag D is "1" (Step ST140). If the condition is D≠1 (answer "NO" is given in Step ST140), the process returns to Step ST120 without executing the switching to the animation image, whereas, if the condition is D=1 (answer "YES" is given in Step ST140), the count "t" is reset to "0" (Step ST150) and, after executing the display of the animation image (Step ST160), the process returns to Step ST120.

As has been described, the illustrated embodiment of the present invention displays, when the predetermined condition is met, animation images of the fish 35 hooked on by the fishing line 34 in such a manner as to permit identification of the fisher character 31a or 31b whose fishing line 34 has hooked on the fish 35. Therefore, the game players can clearly understand which one of the fisher characters 31a, 31b has hit the fish 35. In addition, the animation images of the fish 35 hooked on by the fishing line 34 are displayed over the entire display area of the monitor 12, so that a realistic game can be implemented by vigorous display image, although the game runs through a competition between two fisher characters 31a, 31b.

When the first condition indicates that a fish 35 has been hooked on by the fishing line 34, the display is switched immediately to display the animation images, thereby informing the game player of the hit of the fish 35 without delay.

The switching to the animation image is prohibited when other fisher character is performing casting. It is therefore possible to prevent suspension of display of the casting action due to sudden switching of the display from the fishing image representing casting to the animation image.

Switching to the animation images is prohibited until a predetermined time elapses after the last display of the animation image. It is therefore possible to prevent repetition of suspension of display of the fishing image due to a frequent switching to the animation image.

When the number extracted in accordance with a random number table is an odd number, the switching to the animation image is prohibited. This serves to reduce, at a certain random or odd, the frequency of switching to the animation images, thus preventing the interval of switching to the animation image from being fixed, thereby enhancing variation of the game display screen.

The present invention is not limited to the embodiment described heretofore, but may be modified as follows.

(1) In the described embodiment, the time measuring means 55 commences the time measurement when the display screen is changed from the fishing image to the animation image. This, however, is not essential and the time measurement may be commenced when the display of animation image is finished.

(2) In the embodiment described hereinbefore, a lake is assumed to be the fishing site. This also is only illustrative and the fishing site may be a river, sea or the like.

From the foregoing description of the preferred embodiment, it will be seen that the present invention offers the following advantages.

According to the major features of the present invention, determination is made as to whether a predetermined first condition pertaining to fishing has been met and, when the first condition is determined to have been met, the game display screen is temporarily switched from the fishing image to an animation image. The animation image is displayed in such a manner as to enable identification of the fisher character whose fishing line has hooked up the fish of the animation image, so that the game player can understand which one of the fisher characters has hit the fish, whereby the animation image is suitably displayed on the displaying means.

Letters which indicate the fisher character whose fishing line hooked on the fish of the animation display may be displayed at a predetermined position on the display means, so that the game player can know without fail which one of the fisher characters has hit the fish.

In a specific form of the invention, a determination is made as to whether a predetermined second condition pertaining to fishing has been met and, when it is determined that the second condition is met, the switching operation to be performed by the switching means is prohibited. The second condition may be determined to be a condition or a situation where the display of the animation image is inadequate. When such a situation has occurred, the second condition is met to prevent the animation image from being displayed.

In another form of the invention, time lapsed is measured from the moment at which the game display screen is switched by the switching means, each time such a switching is performed. The second determining means determines that the second condition is met, when the measured time lapsed is not longer than a predetermined time at the moment at which the first condition is determined to have been met. This arrangement avoids suspension of the display of the fishing image due to frequent switching of the game display screen to the animation image.

In a further specific form of the invention, when the first condition is determined to have been met, a determination is made as to whether an instruction for a specific action among fishing actions is being given to a fisher character other than the identified fisher character is giving an instruction. The second condition is determined to have been met when it is determined that the instruction for the specific action is being given to the other fisher character. Therefore, the switching to the animation image is prohibited when the other fisher character is performing a predetermined action such as casting, thereby preventing the display of the casting action from being suspended due to switching from the fishing image showing the casting action to the animation image.

Although the invention has been described through its preferred forms, it is to be understood that the described embodiment is only illustrative and various changes and modifications may be imparted thereto without departing from the scope of the present invention which is limited solely by the appended claims.

What is claimed is:

1. A video game apparatus which implements a competition between fisher characters in a simulated fishing site in which the fisher characters attempt to fish up by fishing lines fishes that exhibit predetermined behaviors, said video game apparatus comprising:
   a plurality of operating means corresponding to the respective fisher characters, for giving fishing action instructions to the respective fisher characters;
   displaying means for displaying a game display screen;
   image storing means for storing animation images representing behaviors of hooked fishes;
   fishing display controlling means for causing said displaying means to display, as said game display screen, a fishing image including said simulated fishing site and said fisher characters;
   first determining means for determining whether a predetermined first condition pertaining to fishing has been met;
   animation display controlling means for causing said displaying means to display, as said game display screen, said animation images; and
   switching means for switching said game display screen from said fishing image to said animation images when said first determining means has determined that said first condition has been met;
   wherein said animation display controlling means displays said animation images in such a manner as to enable identification of the fisher character whose fishing line has hooked up a fish.

2. A video game apparatus according to claim 1, further comprising:
   second determining means for determining whether a predetermined second condition pertaining to fishing has been met; and
   switching prohibiting means for prohibiting the switching of the game display screen when said second determining means has determined that said second condition has been met.

3. A video game apparatus according to claim 2, further comprising time measuring means for measuring time lapsed after each switching of the game display screen performed by said switching means,
   wherein said second determining means determines that said second condition has been met, when the time measured by said time measuring means by the moment at which said first determining means has determined that said first condition is met is not longer than a predetermined time.

4. A video game apparatus according to claim 2, further comprising operation determining means for determining, when said first determining means has determined that said first condition is met, whether said operating means for a fisher character other than the identified fisher character is giving an instruction for a specific action among fishing actions,
   wherein said second determining means determines that said second condition has been met when said operation determining means has determined that the instruction for said specific action is being given to the other fisher character.

5. A video game which implements a competition between fisher characters in a simulated fishing site in which the fisher characters attempt to fish up by fishing lines fisher that exhibit predetermined behaviors, said video game apparatus comprising:
   a plurality of operating means corresponding to the respective fisher characters, for giving fishing action instructions to the respective fisher characters;
   displaying means for displaying a game display screen;
   image storing means for storing animation images representing behaviors of hooked fishes;
   fishing display controlling means for causing said displaying means to display, as said game display screen, a fishing image including said simulated fishing site and said fisher characters;
   first determining means for determining whether a predetermined first condition pertaining to fishing has been met;
   animation display controlling means for causing said displaying means to display, as said game display screen, said animation images, said animation display controlling means causes said displaying means to display, at a predetermined position on said displaying means, a letter which identifies the fisher character whose fishing line has hooked up the fish of the animation image; and
   switching means for switching said game display screen from said fishing image to said animation images when said first determining means has determined that said first condition has been met;
   wherein said animation display controlling means displays said animation images in such a manner as to enable identification of the fisher character whose fishing line has hooked up a fish.

6. An animation display controlling method for use in a video game which implements a competition between fisher characters in a simulated fishing site in which the fisher characters attempt to fish up by fishing lines fishes that exhibit predetermined behaviors, said method comprising:
  giving instructions for fishing actions to the fisher characters by means of operating means corresponding to the respective fisher characters;
  causing displaying means to display, as a game display screen, a fishing image which includes said simulated fishing site and said fisher characters;
  determining whether a predetermined first condition has been met;
  temporarily switching the game display screen from said fishing image to an animation image that represents behaviors of a fish hooked by a fishing line, when said first condition has been determined to be met; and
  displaying said animation image in such a manner as to enable identification of the fisher character whose fishing line has hooked up the fish of the animation image.

7. A readable storage medium storing an animation display controlling program for use in a video game which implements a competition between fisher characters in a simulated fishing site in which the fisher characters attempt to fish up by fishing lines fishes that exhibit predetermined behaviors, said program comprising:
  an instructing step for giving instructions for fishing actions to the fisher characters by means of operating means corresponding to the respective fisher characters;
  a fishing displaying step for causing displaying means to display, as a game display screen, a fishing image which includes said simulated fishing site and said fisher characters;
  a first determining step for determining whether a predetermined first condition pertaining to fishing has been met;
  a switching step for temporarily switching the game display screen from said fishing image to animation images that represent behaviors of a fish hooked by a fishing line, when said first condition has been determined to be met; and
  an animation displaying step for displaying said animation images in such a manner as to enable identification of the fisher character whose fishing line has hooked up a fish.

8. A video game which implements competition between a plurality of fishing characters at a simulated fishing site in which the fishing characters attempt to hook fish comprising:
  a player controller operable by plural game players for giving fishing action instructions to the respective plural fishing characters;
  a game display screen;
  a fishing display controller enabling said display screen to display fishing site images which simultaneously display plural fishing characters;
  image storing apparatus for storing animation images representing behavior of a fish hooked by said fishing characters;
  first determining apparatus for determining whether a predetermined first condition pertaining to fishing has been met;
  an animation display controller causing said display screen to display animation images of a fish hooked by one of said fishing characters and to display an identifier identifying the fishing character who has hooked said fish; and
  switching apparatus for switching said game display screen from displaying said fishing images to displaying said animation images when said first determining apparatus has determined that said first condition has been met;
  wherein said animation display controller causes said display screen to display said animation images in such a manner as to enable identification of the fishing character who has hooked a fish even though said fishing images including said plural fishing characters are no longer being displayed on said display screen.

9. A video game according to claim 8 wherein said animation display controller causes said screen display to display said identifier in the form of indicia which identifies the fishing character who has hooked the fish in the animation image.

10. A video game according to claim 8 further comprising:
  second determining apparatus for determining whether a predetermined second condition pertaining to fishing has been met; and
  switching prohibiting apparatus for prohibiting the switching apparatus from switching the display screen from displaying said fishing images to displaying said animation images when said second determining apparatus has determined that said second condition has been met.

11. A video game according to claim 10 further comprising time measuring apparatus for measuring time lapsed after each switching of the display screen by said switching apparatus,
  said second determining apparatus determining that said second condition has been met when the time measured by said time measuring apparatus, from the time at which said first determining means has determined that said first condition is met, is not longer than a predetermined time.

12. A video game according to claim 10 further comprising an operation determining device for determining, when said first determining apparatus has determined that said first condition is met, whether said player controller for a fishing character, other than the fishing character identified by said identifier, is giving specific fishing action instruction,
  said second determining apparatus determining that said second condition has been met when said operation determining device has determined that the instruction for said specific fishing action is being given to the other fishing character.

13. A video game according to claim 8 wherein said switching apparatus provides for the display of said animation images to the exclusion of simultaneous display of said fishing images.

14. A video game according to claim 13 wherein said animation images are displayed over the entire display area of said display screen.

15. A video game according to claim 8 wherein said switching apparatus provides for the display of said fishing images to the exclusion of simultaneous display of said animation images.

16. A video game according to claim 8 wherein said first determining apparatus determines when a fish has been hooked by a fishing character.

17. A video game according to claim 8 wherein said first determining apparatus determines that said fishing site images display a fish jumping above a water surface.

18. A video game according to claim 8 wherein said first determining apparatus determines that said fishing site images display an amount of tension applied to a fishing line.

19. A video game which implements competition between fishing characters at a simulated fishing site in which the fishing characters attempt to hook fish comprising:
- a game display screen;
- a display screen controller enabling said display screen to display fishing site images which include simultaneously display of fishing site scenery and a plurality of fishing characters;
- at least one game player-operated device operated by one game player for enabling said one game player to effect display on said display screen, as part of said fishing site images, the actions of said one fishing character attempting to hook a fish;
- at least one other game player-operated device operated by at least one other game player for enabling said other game player to effect display on said display screen, as part of said fishing site images, the actions of said other fishing character attempting to hook a fish;
- image storing apparatus for storing animation images representing behavior of hooked fish;
- first determining apparatus for determining whether a predetermined first condition pertaining to fishing has been met;
- an animation display controller causing said display screen to display said animation images, said animation display controller including an identification device enabling identification of the fishing character whose fishing line has hooked a fish; and
- switching apparatus for switching said game display screen from displaying said fishing site images to displaying said animation images when said first determining apparatus has determined that said first condition has been met.

20. A video game according to claim 19 wherein said fishing site images display the amount of tension on the fishing lines of the respective fishing characters.

21. A video game according to claim 19 wherein fishing site images display fishing lures used by the respective fishing characters.

22. A video game according to claim 19 wherein said fishing characters use lines to simulate fishing, said fishing site images displaying the depth of said lines.

23. A video game according to claim 19 wherein said display of the actions of said other fishing character attempting to hook a fish comprising displaying said other fishing character performing a casting action, said switching apparatus preventing said display screen from switching from said fishing site images to said animation images when said one fishing character hooks a fish and said other fishing character is performing a casting action.

24. A method which implements competition between fishing characters at a simulated fishing site in which the fishing characters attempt to hook fish by fishing lines comprising:
- displaying on a display screen fishing images which simultaneously display a fishing site and plural fishing characters;
- providing a player controller operable by plural game players for giving instructions for fishing action to the respective fishing characters;
- determining whether a predetermined first condition has been met;
- temporarily switching the game display screen from said fishing images to an animation image that represents behavior of a fish hooked by a fishing line when said first condition has been determined to have been met; and
- displaying said animation image to the exclusion of display of said fishing images in such a manner as to enable identification of the fishing character whose fishing line has hooked the fish on the animation image.

25. A method according to claim 24 wherein said step of determining whether a predetermined first condition has been met comprises determining whether a fish has been hooked by a fishing character.

26. A readable storage medium storing an animation display controlling program for use in a video game which implements competition between fishing characters at a simulated fishing site in which the fishing characters attempt to fish up by fishing lines comprising:
- a fishing displaying step for causing display on a display screen fishing images which simultaneously display a fishing site and plural fishing characters;
- an instructing step for giving instructions for fishing actions to the fishing characters by means of a controller operated by plural game players;
- a first determining step for determining whether a predetermined first condition pertaining to fishing has been met;
- a switching step for temporarily excluding display of said fishing images and to effect display of animation images that represent behavior of fish hooked by a fishing line when said first condition has been determined to have been met;
- said display of animation images providing for identification of the fishing character whose fishing line has hooked the fish being displayed in the animation images.

27. A readable storage medium storing an animation display controlling program according to claim 26 wherein said first determining step comprises determining whether a fish has been hooked by a fishing character.

* * * * *